(12) United States Patent
Okuda (10) Patent No.: US 7,726,192 B2
(45) Date of Patent: Jun. 1, 2010

(54) ULTRASONIC SENSOR

(75) Inventor: Yasuyuki Okuda, Aichi-gun (JP)

(73) Assignee: DENSO CORPORATION, Kariya (JP)

( * ) Notice: Subject to any disclaimer, the term of this patent is extended or adjusted under 35 U.S.C. 154(b) by 307 days.

(21) Appl. No.: 11/905,524

(22) Filed: Oct. 2, 2007

(65) Prior Publication Data

US 2008/0083282 A1    Apr. 10, 2008

(30) Foreign Application Priority Data

Oct. 4, 2006    (JP) .............................. 2006-273063

(51) Int. Cl.
*G01N 9/24* (2006.01)
(52) U.S. Cl. .............................. 73/627; 73/587; 73/649
(58) Field of Classification Search .................. 73/584, 73/587, 591, 596, 617, 627, 649
See application file for complete search history.

(56) References Cited

U.S. PATENT DOCUMENTS

| | | | | |
|---|---|---|---|---|
| 3,938,614 A | * | 2/1976 | Ahs | ............................ 181/129 |
| 5,275,060 A | * | 1/1994 | Lynnworth | ................ 73/861.18 |
| 5,381,386 A | * | 1/1995 | Lum et al. | ................... 367/163 |
| 5,664,456 A | * | 9/1997 | Eckert | ........................ 73/290 V |
| 5,709,432 A | * | 1/1998 | Gryp | ...................... 297/411.32 |
| 5,907,521 A | | 5/1999 | Matsui et al. | |
| 6,672,166 B2 | * | 1/2004 | Pfeifer | ......................... 73/632 |
| 6,876,127 B2 | * | 4/2005 | Mitsuoka et al. | ............. 310/324 |
| 7,246,523 B2 | * | 7/2007 | Magane et al. | ................. 73/649 |
| 7,398,687 B2 | * | 7/2008 | Nakajima et al. | .............. 73/661 |
| 7,411,335 B2 | * | 8/2008 | Eckert et al. | ................ 310/322 |
| 7,497,121 B2 | * | 3/2009 | Okuda et al. | ................... 73/632 |
| 7,513,158 B2 | * | 4/2009 | Watanabe et al. | .............. 73/584 |
| 7,612,485 B2 | * | 11/2009 | Sugiura et al. | ............... 310/324 |
| 7,614,305 B2 | * | 11/2009 | Yoshioka et al. | ............... 73/627 |
| 2003/0121331 A1 | * | 7/2003 | Mitsuoka et al. | ............... 73/632 |
| 2004/0161130 A1 | * | 8/2004 | Suzuki | ........................ 381/431 |
| 2004/0163883 A1 | * | 8/2004 | Suzuki | ........................ 181/173 |
| 2007/0115102 A1 | * | 5/2007 | Nakano et al. | .............. 340/435 |
| 2007/0115758 A1 | * | 5/2007 | Kojima et al. | ................ 367/197 |
| 2007/0144261 A1 | * | 6/2007 | Okuda et al. | ................... 73/627 |

(Continued)

FOREIGN PATENT DOCUMENTS

JP    A-1-101100    4/1989

(Continued)

OTHER PUBLICATIONS

Office Action mailed Nov. 18, 2009 from the German Patent Office in the corresponding patent application No. 10 2007 047 274.0-55 (English translation enclosed).

*Primary Examiner*—Hezron Williams
*Assistant Examiner*—Samir M Shah
(74) *Attorney, Agent, or Firm*—Posz Law Group, PLC (57) ABSTRACT

An ultrasonic sensor attached to a certain object, includes an ultrasonic detecting element, an acoustic matching member, and a reflection limiting member. The ultrasonic detecting element detects an ultrasonic wave. The acoustic matching member has a receiving surface that is adapted on a side of the certain object to face toward the detected body. The reflection limiting member is disposed to a side portion of the acoustic matching member between the receiving surface and an opposing surface of the acoustic matching member. The reflection limiting member limits the ultrasonic wave, which transmits inside the acoustic matching member, from being reflected by the side portion.

16 Claims, 6 Drawing Sheets

U.S. PATENT DOCUMENTS

2008/0072675 A1* 3/2008 Okuda et al. .................. 73/627
2008/0307888 A1* 12/2008 Yoshioka et al. .............. 73/627

FOREIGN PATENT DOCUMENTS

| | | |
|---|---|---|
| JP | A-5-304699 | 11/1993 |
| JP | U-6-44299 | 6/1994 |
| JP | A-10-224895 | 8/1998 |
| JP | A-2004-297219 | 10/2004 |
| JP | A-2005-24351 | 1/2005 |
| JP | A-2005-72771 | 3/2005 |

* cited by examiner

ULTRASONIC SENSOR

CROSS REFERENCE TO RELATED APPLICATION

This application is based on and incorporates herein by reference Japanese Patent Application No. 2006-273063 filed on Oct. 4, 2006.

BACKGROUND OF THE INVENTION

1. Field of the Invention

The present invention relates to an ultrasonic sensor that has an ultrasonic detecting element mounted on an acoustic matching layer thereof.

2. Description of Related Art

There is conventionally known an ultrasonic sensor in which an ultrasonic transducer is attached to a substrate made of a metal, a resin material or the like, the ultrasonic sensor being mounted on. For example, an automobile (vehicle). The ultrasonic sensor transmits an ultrasonic wave by using an element capable of transmitting and receiving the ultrasonic wave, and receives the ultrasonic wave, which collides with and is reflected from a detected body by using the element, thereby performing a position measurement or a distance measurement of an object around the vehicle, or a measurement of a two-dimensional configuration or a three-dimensional configuration of the object.

Such an ultrasonic sensor may be provided with an acoustic matching layer, which adjusts an acoustic impedance to improve a transmission efficiency of transmitted/received ultrasonic waves. For example, there is known an ultrasonic sensor in which an acoustic matching layer is fixed on one face of a piezoelectric element, the acoustic matching layer being formed to have a thickness of one quarter of the ultrasonic wave by a material, in which glass balloons are diffused in an synthetic resin (see JP-A-H10-224895).

Because the ultrasonic sensor of the above type is attached to a place, which is observable from exterior, the ultrasonic sensor is reduced in size in order not to degrade a sense of beauty of the appearance. In other words, the area of the acoustic matching layer, the area being exposed to the exterior, is required to be made small.

However, when the area of the acoustic matching layer is reduced, the influence of the reflection of the ultrasonic wave at the side face of the acoustic matching layer becomes larger. As a result, the ratio of the noise to the signal becomes larger, and thereby the detection sensitivity to the ultrasonic wave is degraded. Due to the above disadvantage, the area of the acoustic matching layer has been kept from being made smaller.

SUMMARY OF THE INVENTION

The present invention is made in view of the above disadvantages. Thus, it is an objective of the present invention to address at least one of the above disadvantages.

To achieve the objective of the present invention, there is provided an ultrasonic sensor attached to a certain object, the sensor including an ultrasonic detecting element, an acoustic matching member, and a reflection limiting member. The ultrasonic detecting element detects an ultrasonic wave, which is transmitted by an ultrasonic transmitting element that transmits the ultrasonic wave, and which is reflected by a detected body. The acoustic matching member has a receiving surface that is adapted on a side of the certain object to face toward the detected body. The receiving surface receives the ultrasonic wave reflected by the detected body. The acoustic matching member transmits the ultrasonic wave received by the receiving surface to the ultrasonic detecting element, which is attached to an opposing surface of the acoustic matching member opposite the receiving surface. The acoustic matching member is made of a material having an acoustic impedance larger than that of air and smaller than that of the ultrasonic detecting element. The acoustic matching member is adapted such that a standing wave is generated inside of the acoustic matching member due to the ultrasonic wave received by the receiving surface. The reflection limiting member is disposed to a side portion of the acoustic matching member between the receiving surface and the opposing surface. The reflection limiting member limits the ultrasonic wave, which transmits inside the acoustic matching member, from being reflected by the side portion.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF PREFERRED EMBODIMENTS

First Embodiment

A ultrasonic sensor according to a first embodiment of the present invention is described referring to accompanying drawings. The present embodiment describes an example in which the ultrasonic sensor is mounted on a vehicle for use as an obstacle sensor.

Figure 1A:
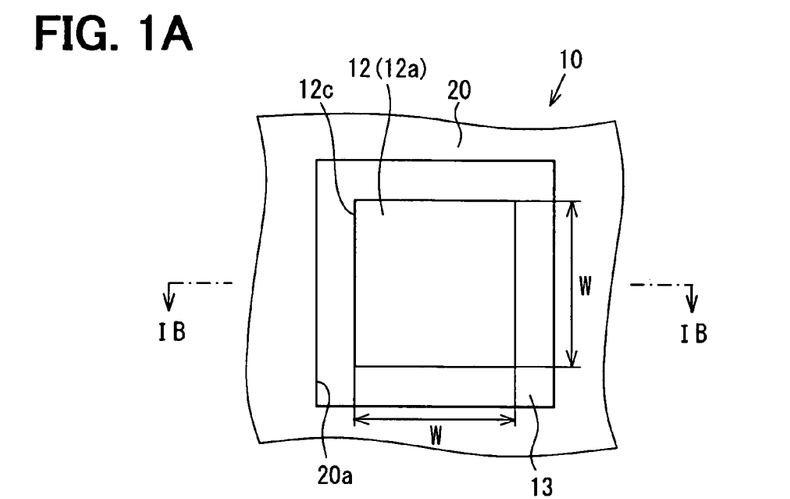
FIG. 1A is a plan view illustrating an ultrasonic sensor according to a first embodiment of the present invention viewed from a side toward an acoustic matching member.
Figure 1B:
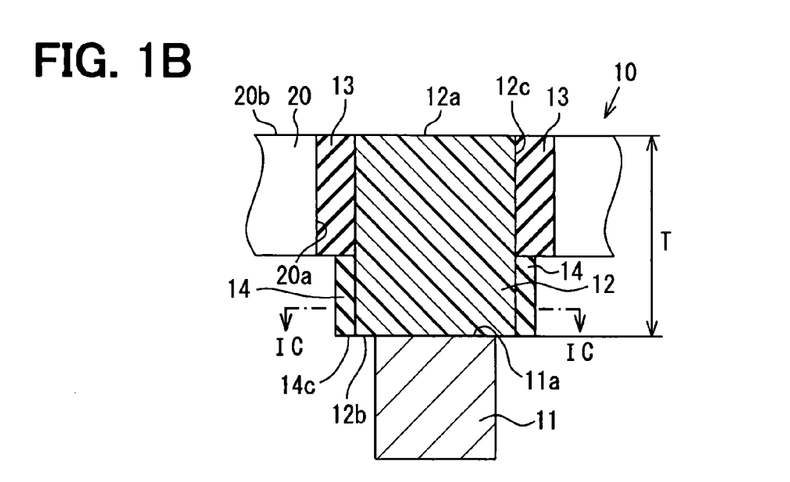
FIG. 1B is a cross-sectional view taken along line IB-IB in FIG. 1A.

Here, an upward direction in FIG. 1B indicates an exterior of a vehicle. It should be noted that a part of each figure is expanded for explanation and the other part of each figure is omitted.

Figure 1C:
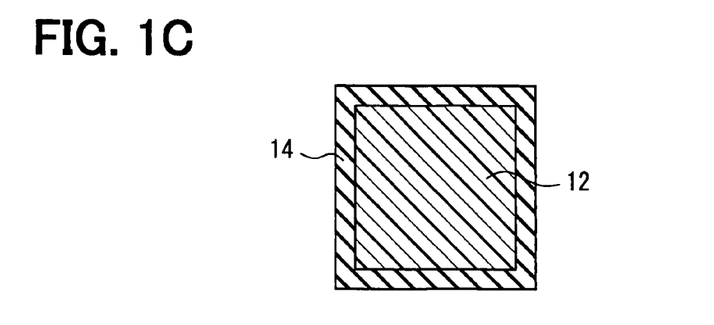
FIG. 1C is a transverse cross-sectional view of the acoustic matching member taken along line IC-IC in FIG. 1B.

As shown in FIGS. 1A to 1C, an ultrasonic sensor 10 includes an ultrasonic detecting element 11, an acoustic matching member 12, and a reflection limiting member 14. The ultrasonic detecting element 11 detects an ultrasonic wave, which is transmitted by an ultrasonic wave generating element frontward of the vehicle, and which is reflected by a detected body (obstacle) existing frontward of the vehicle. The acoustic matching member 12 receives the ultrasonic wave and transmits oscillation. The reflection limiting member 14 is provided around a side of the acoustic matching member 12 to limit reflection of the ultrasonic wave reflected at the side.

The ultrasonic sensor 10 receives the ultrasonic wave, which is transmitted by an ultrasonic wave ultrasonic transmitting element (not shown), and which is reflected by an obstacle, through a receiving surface 12a of the acoustic matching member 12. The ultrasonic wave received by the receiving surface 12a is transmitted to the ultrasonic detecting element 11 via the acoustic matching member 12. The ultrasonic wave transmitted to the ultrasonic detecting element 11 is detected by the ultrasonic detecting element 11, and is converted into a voltage signal.

A circuit element (not shown) electrically connected to the ultrasonic detecting element 11 is electrically connected to an ECU, which performs calculation processing based upon a voltage signal outputted from the ultrasonic detecting element 11. For example, a time difference or a phase difference between the transmitted ultrasonic wave and the received ultrasonic wave is determined, thereby making it possible to perform a distance measurement or the like to the obstacle.

The ultrasonic detecting element 11 is attached to the center of an attachment surface 12b (opposing surface) opposing the receiving surface 12a of the acoustic matching member 12 for receiving an ultrasonic wave, by an adhesive or the like. The acoustic matching member 12 is attached to a predetermined position of a vehicle 60, for example, a bumper 20 (refer to FIG. 7) in the present embodiment.

The bumper 20 includes an attachment portion 20a that is formed to penetrate through the bumper 20 in a size for receiving the acoustic matching member 12. The acoustic matching member 12 has a side portion 12c, which is in the vicinity of the receiving surface 12a, for attachment to the attachment portion 20a via an oscillation damping member 13 in a state the receiving surface 12a is exposed to an outside of the bumper 20. Here, the oscillation damping member 13 is provided between the attachment portion 20a and the acoustic matching member 12 to damp the transmission of the ultrasonic wave.

Here, the receiving surface 12a of the acoustic matching member 12 is flush with the oscillation damping member 13 and an outer surface 20b of the bumper 20 and has a smooth flat surface formed thereon.

The ultrasonic detecting element 11 is formed in a square, columnar shape having a thickness of 3 mm and a square shaped section of 2 mm×2 mm. Also, the ultrasonic detecting element 11 includes electrodes and a piezoelectric element formed of lead zirconate titanate (PZT), which is provided between the electrodes. Because the PZT has a large piezoelectric constant, it can receive an ultrasonic wave having a small sound pressure to provide high detection sensitivity to the ultrasonic wave. Therefore, it can be suitable for an ultrasonic detecting element.

The acoustic matching member 12 is formed of a material having a sound impedance which is larger than that of air and smaller than that of the ultrasonic detecting member 11. Also, the acoustic matching member 12 has a square, columnar shape and has a transverse cross section of a substantial quadrate shape.

In consequence, as compared to a case of no attachment of the acoustic matching member 12, a difference in the acoustic impedance in the boundary with the air can be made smaller. Accordingly, reflection of an ultrasonic wave in the boundary with the air can be restricted such that an incident ultrasonic wave increases.

In addition, since the ultrasonic detecting member 11 is attached in a position of being invisible from an outside of the bumper 20, the acoustic matching member 12 also serves as a protection member for protecting the ultrasonic detecting member 11 from foreign matter or water (moisture).

In the present embodiment, the acoustic detecting member 12 is formed of a resin material such as polycarbonate based resin having an excellent durability. Because the polycarbonate based resin has a degree of elasticity a temperature change of which is small, a change of a wavelength of the ultrasonic wave accompanying the temperature change can be made small, making it possible to stably (reliably) generate a standing wave as described later.

The acoustic matching member 12 is formed so as to have a thickness T of generally one quarter of the wavelength of the ultrasonic wave inside the ultrasonic detecting member 12. For example, in a case where a frequency of the ultrasonic wave is 65 kHz, the width W is approximately 2.6 mm and the thickness T is approximately 5 mm.

The acoustic matching member 12 is formed to have the thickness T which is one quarter of the wavelength of the ultrasonic wave and thereby, a standing wave can be generated inside the acoustic matching member 12. This helps in reducing cancellation of the ultrasonic wave incident inside the acoustic matching member 12 and the ultrasonic wave reflected on the boundary between the acoustic matching member 12 and the ultrasonic detecting member 11, the cancellation being caused by interference with each other. In consequence, the ultrasonic wave can be efficiently transmitted to the ultrasonic detecting element 11.

The receiving surface 12a of the acoustic matching member 12 has an area larger than that of the attachment surface 11a of the ultrasonic detecting member 11. When the ultrasonic matching member 12 is formed in this way, since the energy of the ultrasonic wave received on the receiving surface 12a is transmitted by the area smaller than that of the receiving surface 12a, the energy per unit area increases, thereby enabling an increase in transmission efficiency of the energy.

Here, it is preferable that an area of the attachment surface 12a is approximately 1.2 times of an area of the attachment surface 11a of the ultrasonic detecting member 11. It is noted that even in a case where the area of the attachment surface 12a of the acoustic matching member 12 is generally equal to or smaller than the area of the attachment surface 11a of the ultrasonic detecting element 11, the attachment surface 12a can receives the ultrasonic wave.

It should be noted that a resin material is exemplified as the acoustic matching member 12, but on condition of satisfying a relation of acoustic impedance and a relation between wave length and dimension, for example, a metallic material (e.g., aluminum), ceramics or glass may be used. Each of these materials has an environment resistance such as an atmospheric corrosion resistance in the same way with the resin material, and can be suitable in use for the acoustic matching member 12.

The acoustic matching member 12 may have a different configuration from the above square column shape, but a circular, columnar shape. In addition, by forming the acoustic matching member 12 to have a width of less than a half (½) of the wavelength of the ultrasonic wave, in a case of arranging a plurality of ultrasonic sensors 10 in an array as shown in a second embodiment to be described later, a distance between the central portions of the acoustic matching members 12 can be made to be equal to one half (½) of the wavelength of the ultrasonic wave transmitting in the air. This arrangement brings about high detection accuracy. In a case of not arranging the plurality of the ultrasonic sensors in the array, the width of the acoustic matching member 12 may not be equal to or less than the half of the wavelength of the ultrasonic wave in the air.

An oscillation damping member 13 is interposed between the side portion 12c of the acoustic matching member 12 and the attachment portion 20a of the bumper 20 for fixing the side portion 12c of the acoustic matching member 12 to the attachment portion 20a and preventing transmission of oscillation from the attachment portion 20a of the bumper 20.

The oscillation damping member 13 is formed to have a thickness generally identical to that of the attachment portion 20a. The oscillation damping member 13 fixes the acoustic matching member 12 to the attachment portion 20a such that the receiving surface 12a of the acoustic matching member 12 is flush with an outer surface of the bumper 20. The oscillation damping member 13 is adhered to the side portion 12c and the attachment portion 20a of the acoustic matching member 12 via adhesive or the like.

Because the oscillation damping member 13 is provided between the bumper 20 and the acoustic matching member 12, the ultrasonic wave is limited from being transmitted from the bumper 20 to the side portion 12c of the acoustic matching member 12 via the attachment portion 20a, and thereby being limited from causing noises.

The reflection limiting member 14, which has a flat plate shape, is adhered, via the adhesive, to the side portion 12c of the acoustic matching member 12 inside the oscillation damping member 13. In other words, the side portion 12c of the acoustic matching member 12 is covered with the oscillation damping member 13 and with the reflection limiting member 14.

The reflection limiting member 14 has acoustic impedance smaller than that of the acoustic matching member 12, and is made of a material, such as silicone rubber, having a large damping constant.

In a case where the acoustic matching member 12 is reduced in size such that the area of the receiving surface 12a is made smaller, part of the ultrasonic wave received by the receiving surface 12a is transmitted to the side portion 12c before reaching the ultrasonic detecting element 11. In the above described case, the difference in the acoustic impedance at the boundary between the side portion 12c and exterior air becomes larger if an ultrasonic sensor is not provided with the reflection limiting member 14. As a result, the ultrasonic wave is reflected by the side portion 12c such that the ultrasonic wave travels into the acoustic matching member 12. The reflected ultrasonic wave interferes with the ultrasonic wave that travels in a direction other than a direction toward the side portion 12c, causing the noise.

In the structure of the present embodiment, the reflection limiting member 14 is made of a material having the acoustic impedance smaller than that of the acoustic matching member 12. Thus, the difference in the acoustic impedance between the reflection limiting member 14 and the acoustic matching member 12 can be made smaller than the difference in the acoustic impedance between the air and the acoustic matching member 12. Due to the above feature, the ultrasonic wave transmitted to the side portion 12c of the acoustic matching member 12 is more effectively transmitted into the reflection limiting member 14. As a result, the ultrasonic wave is effectively limited from being reflected by the side portion 12c of the acoustic matching member 12.

Therefore, the receiving surface 12a of the acoustic matching member 12 is not required to have an larger area in order to minimize the influence of the reflection of the ultrasonic wave by the side portion 12c. As a result, the area of the acoustic matching member 12 can be made smaller, and the ultrasonic sensor 10 can be limited from standing out. Thus, the ultrasonic sensor 10 of a great design can be produced such that the appearance of the bumper 20 can remain good.

The oscillation damping member 13 is preferably made of a material having a small degree of elasticity and having a small density. For example, a rubber based material, a resin (e.g., a foam resin) having pores, a sponge can be used as the material for the oscillation damping member 13. Because the material having the small degree of elasticity has a small force for damping the oscillation of the acoustic matching member 12 due to the ultrasonic wave, decay (damp) of the oscillation of the ultrasonic wave can be reduce.

As a result, the noise of the ultrasonic wave is reduced, and the decay of the oscillation can be made smaller. Thus, the detection sensitivity to the ultrasonic wave can be improved.

The reflection limiting member 14 may have a hollow-square cross section, the inner size of which is slightly smaller than a size of the side portion 12c of the acoustic matching member 12. Due to the above shape and size, the reflection limiting member 14 can be attached to the acoustic matching member 12 by fitting the side portion 12c of the acoustic matching member 12 into the reflection limiting member 14. In the above structure, a process for adhering is not required.

The reflection limiting member 14 may be formed by applying a liquid resin material to the side portion 12c of the acoustic matching member 12 and then by hardening the resin material. In the above structure, adherence between the acoustic matching member 12 and the reflection limiting member 14 can be improved.

Alternatively, a tape material may be wound around the side portion 12c of the acoustic matching member 12 to form the reflection limiting member 14.

Further, the reflection limiting member 14 may be formed integrally with the oscillation damping member 13 by a common material common to the oscillation damping member 13 (e.g., the oscillation damping member 13 is made of the common material). According to the structure, the reflection limiting member 14 is not required to be formed separately from the oscillation damping member 13, thereby shortening a manufacturing process.

As shown in FIG. 1B, the reflection limiting member 14 is provided to part of the acoustic matching members 12, the part of the acoustic matching members 12 projecting from the bumper 20. Also, the reflection limiting member 14 has an end surface 14c on a side of the reflection limiting member 14 toward the ultrasonic detecting element 11, and the end surface 14c of the reflection limiting member 14 is flush with the opposing surface 12b of the acoustic matching members 12.

Advantages of the first embodiment are described.

(1) The ultrasonic sensor 10 has the ultrasonic detecting element 11 that detects the ultrasonic wave reflected by the detected body (obstacle) and has the acoustic matching member 12 that transmits the received ultrasonic wave to the ultrasonic detecting element 11. Also, the ultrasonic sensor 10 includes the reflection limiting member 14 that is provided at the side portion 12c of the acoustic matching member 12 for limiting the reflection, at the side portion 12c, of the ultrasonic wave traveling inside the acoustic matching member 12. Thus, the acoustic matching member 12 is not required to have the large area in order to limit the influence of the reflection of the ultrasonic wave at the side portion 12c. As a result, there can be provided the ultrasonic sensor 10 that can reduce the acoustic matching member 12 in size.

When the ultrasonic sensor 10 is applied to an obstacle sensor that senses an obstacle or a person around a vehicle 60, the area of the receiving surface 12a, which is exposed outside the vehicle 60, can be reduced. Thus, the design of the vehicle 60 can be improved.

(2) The reflection limiting member 14 is made of a material having the acoustic impedance smaller than that of the acoustic matching member 12. As a result, the difference in the acoustic impedance between the reflection limiting member 14 and the acoustic matching member 12 can be made smaller than the difference in the acoustic impedance between the air and the acoustic matching member 12. Therefore, the ultrasonic wave transmitted to the side portion 12c of the acoustic matching member 12 can be effectively transmitted into the reflection limiting member 14, and thereby reflection of the ultrasonic wave at the side portion 12c of the acoustic matching member 12 can be effectively limited. Thus, the area of the receiving surface 12a of the acoustic matching member 12 is not required to be enlarged in order to avoid the influence from the reflection of the ultrasonic wave at the side portion 12c. As a result, the acoustic matching member 12 can be reduced in size.

Also, because the reflection limiting member 14 is made of a material having the degree of elasticity smaller than that of the acoustic matching member 12, the force by the ultrasonic wave for restraining the oscillation of the acoustic matching member 12 is small. Thus, the decay of the ultrasonic wave oscillation can be made small. As a result, the decay (damp) of the oscillation can be made small, improving the detection sensitivity to the ultrasonic wave.

A silicone rubber is a material having a low acoustic impedance and a low degree of elasticity. Thus, the silicone rubber can be used as a material for the reflection limiting member 14.

(3) The ultrasonic sensor 10 includes the oscillation damping member 13 that is provided between the attachment portion 20a and the acoustic matching member 12 and that damps the transmission of the oscillation from the vehicle 60 (bumper 20) to the acoustic matching member 12. As a result, the ultrasonic wave is limited from being transmitted from the vehicle 60 (bumper 20) to the acoustic matching member 12, and this limits the ultrasonic wave from becoming a cause of the noise. Due to the above structure, the noise of the ultrasonic wave can be reduced, and the detection sensitivity to the ultrasonic wave can be improved.

Also, if the reflection limiting member 14 is formed integrally with the oscillation damping member 13 by the common material, the reflection limiting member 14 is not required to be formed independently of the oscillation damping member 13. Thus, the manufacturing process can be shortened.

Second Embodiment

An ultrasonic sensor according to the second embodiment of the present invention is described referring to the accompanying drawings.

It is noted that components and structures similar to those in the first embodiment are indicated by the same numerals, and explanation thereof is omitted.

In an ultrasonic sensor 50 of the present embodiment, a plurality of sets (pairs) of acoustic matching member 12 and ultrasonic detecting element 11 is arranged in an array. In the present embodiment, as shown FIGS. 2A to 2C, two acoustic matching members are arranged in the longitudinal direction and another two in the lateral direction so that totally four acoustic matching members 12 (12p to 12s) are provided. Also, likewise, four ultrasonic detecting elements 11 (11p and 11q: ultrasonic detecting elements 11 attached to acoustic matching members 12r and 12s are not shown) are correspondingly arranged and attached to the four acoustic matching members 12 to make each pair. This structure provides the ultrasonic sensor 50, which is capable of performing three-dimensional detection on a position of a detected body. The oscillation damping member 13 is interposed between each of the acoustic matching members 12 and between each of the acoustic matching members 12 and the attachment portion 20a. In this way, the respective acoustic matching members 12 are attached to the bumper 20.

Figure 2A:
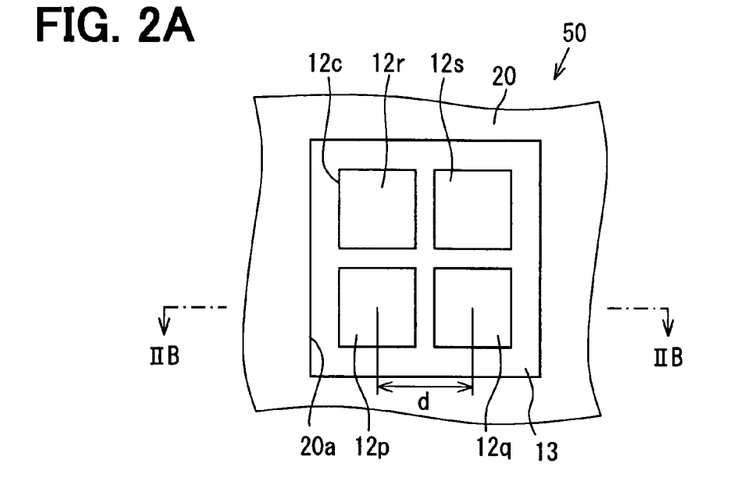
FIG. 2A is a plan view illustrating an ultrasonic sensor according to a second embodiment of the present invention viewed from a side toward an acoustic matching member.
Figure 2B:
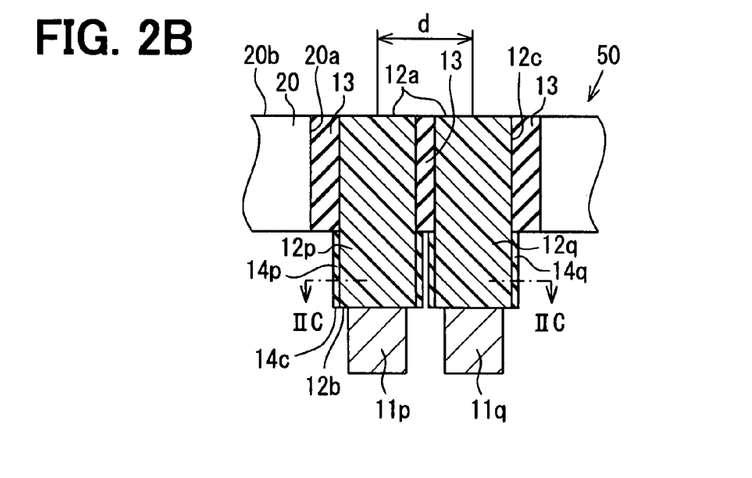
FIG. 2B is a cross-sectional view taken along line IIB-IIB in FIG. 2A.
Figure 2C:
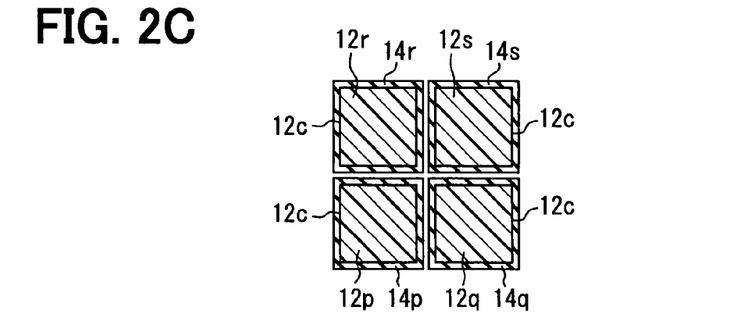
FIG. 2C is a transverse cross-sectional view of the acoustic matching member taken along line IIC-IIC in FIG. 2B.

Also, each acoustic matching member 12 has the reflection limiting member 14 (14p to 14s) similarly to the first embodiment for effectively limiting the reflection of the ultrasonic wave at each side portion 12c of the acoustic matching member 12.

Due to the above structure, the area of each receiving surface 12a of each of the acoustic matching members 12 is not required to be enlarged in order to avoid the influence from the reflection of the ultrasonic wave at the reflection of side portion 12c. As a result, each acoustic matching member 12 can have a smaller area, and thereby making the ultrasonic sensor 50 less standing out. Thus, the ultrasonic sensor 50 having a good design can be produced such that the appearance of the bumper 20 can remain good.

According to the ultrasonic sensor 50, a time difference and a phase difference in the ultrasonic waves received at the respective ultrasonic detecting elements 11 are determined and based upon each difference, not only a distance from the detected body but also a position of the detected body can be measured.

Also, each acoustic matching member 12 is arranged so that a distance d between central portions of the respective adjacent acoustic matching members 12 is generally equal to a half of the wavelength of the ultrasonic wave. For example, the distance d corresponds to a length between a central longitudinal axis of the acoustic matching member 12 (e.g., the member 12p) and a central longitudinal axis of the adjacent acoustic matching member 12 (e.g., the member 12q).

When each of the acoustic matching members 12 is arranged as described above, the time difference can be detected based on the phase difference of the received ultrasonic wave. As a result, the time difference of the received ultrasonic wave can be more accurately detected, and thereby a distance from the detected body and a position of the detected body can be more accurately measured.

Alternatively, the reflection limiting member 14 may not be separately provided to each of the acoustic matching members 12. For example, the reflection limiting member 14 may be provided between each of the acoustic matching members 12.

Figure 3A:
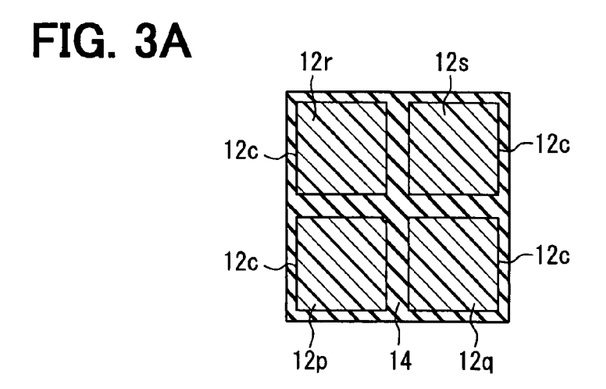
FIG. 3 is a view illustrating a reflection limiting member of the ultrasonic sensor according to a modification of the second embodiment.
Figure 3B:
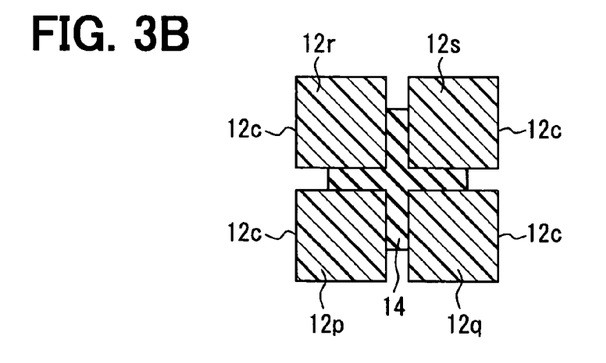

For example, as shown in FIG. 3A, the reflection limiting member 14 may be integrally provided to surround each of the side portions 12c of the acoustic matching members 12. Also, as shown in FIG. 3B, the reflection limiting member 14 may be formed to have a transverse cross section of a cross-joint shape such that the reflection limiting member 14 is provided between each of the acoustic matching members 12 and is in contact with each adjacent one of the acoustic matching members 12.

In the above described structure, one reflection limiting member 14 can limit the reflection of the ultrasonic waves at the multiple acoustic matching members 12. Thus, the number of the reflection limiting members 14 can be reduced compared with a case where each of the acoustic matching members 12 is provided with a corresponding reflection limiting member 14.

Also, because the reflection limiting member 14 is provided between each of the acoustic matching members 12, the reflection limiting member 14 supports each of the acoustic matching members 12. As a result, a rigidity of the acoustic matching members 12 against the shock from the object (bumper 20), on which the acoustic matching members 12 are mounted, can be improved.

Any number of the acoustic matching members 12 and the ultrasonic detecting elements 11 can be used, and the acoustic matching members 12 and the ultrasonic detecting elements 11 can be arranged in any structure depending on the application. For example, in a case of two-dimensional detection on the detected body, two sets of the acoustic matching member 12 and the ultrasonic detecting element 11 should be prepared.

Advantages of the second embodiment are described.

(1) The reflection limiting member 14 can be applied to the ultrasonic sensor 50, in which multiple pairs of the acoustic matching member 12 and the ultrasonic detecting element 11 are arranged in an array for position detection of the detected body. Thus, the reflection of the ultrasonic wave at each side portion 12c of the acoustic matching member 12 can be effectively limited.

Due to the above structure, the area of each receiving surface 12a of the acoustic matching member 12 is not required to be enlarged in order to avoid influence from the reflection of the ultrasonic wave at the side portion 12c, the area of each acoustic matching member 12 can be made small. As a result, the ultrasonic sensor 50 is limited from standing out in appearance. Therefore, the ultrasonic sensor 50 of a good design can be produced, and thereby the design of the vehicle 60 can be improved.

(2) If the reflection limiting member 14 is provided between each of the acoustic matching members 12, one reflection limiting member 14 can limit the reflection of the ultrasonic wave at the multiple acoustic matching members 12. As a result, the number of the reflection limiting members 14 can be reduced compared with a case where the reflection limiting member 14 is provided to each acoustic matching member 12.

Also, because the reflection limiting member 14 is provided between each of the acoustic matching members 12, the reflection limiting member 14 can support each of the acoustic matching members 12. As a result, a rigidity of the acoustic matching members 12 against the shock from the object (bumper 20), on which the acoustic matching members 12 are mounted, can be improved.

Figure 4A:
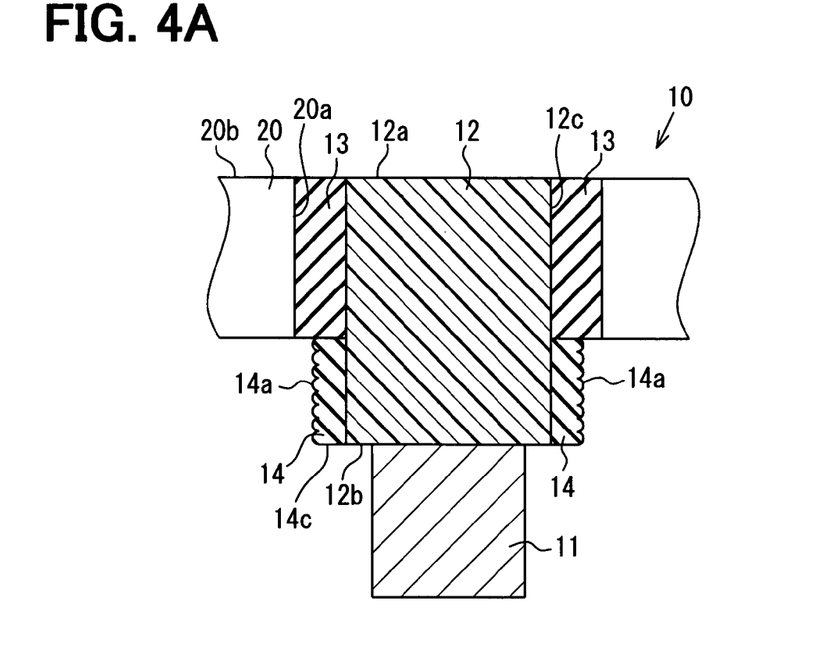
FIGS. 4A and 4B are longitudinal cross-sectional views each showing a reflection limiting member according to another modification.
Figure 4B:
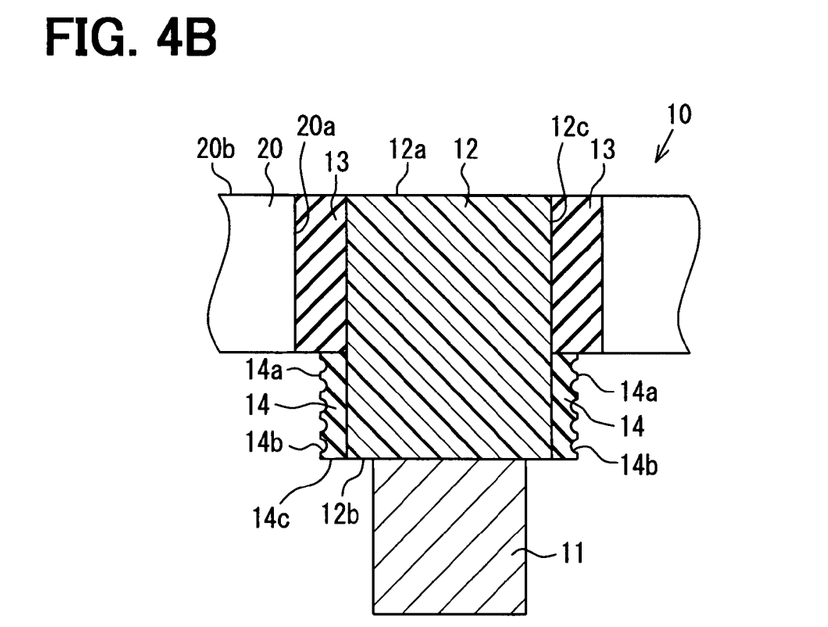

Other Embodiment (1) The reflection limiting member 14 has an outer surface 14a having at least one of a projection portion and a recess portion such that the ultrasonic wave transmitting from the side portion 12c of the acoustic matching member 12 to the inside of the reflection limiting member 14 can be cancelled inside the reflection limiting member 14. For example, as shown in FIG. 4A, the outer surface 14a may have a wave shape, and as shown in FIG. 4B, the entire surface of the outer surface 14a may have recess portions 14b that are dispersedly provided.

Due to the above described structure, the ultrasonic waves transmitting from the side portion 12c into the reflection limiting member 14 are limited from being reflected at the outer surface 14a and cancel with each other inside the reflection limiting member 14. Thus, the ultrasonic waves are limited from re-entering into the acoustic matching member 12.

It is noted that the outer surface 14a may have any shape as long as the outer surface 14a is adapted to have the ultrasonic waves cancel with each other inside the reflection limiting member 14.

Figure 5:
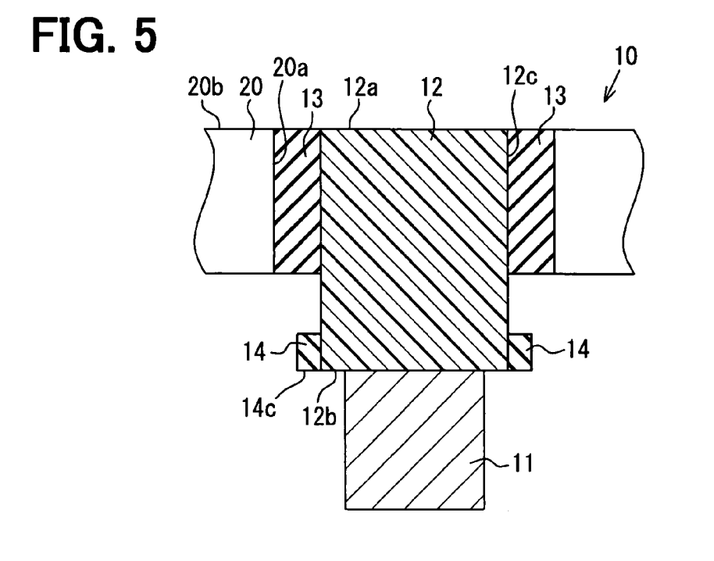
FIG. 5 is a longitudinal cross-sectional view illustrating a reflection limiting member according to another modification.

(2) The reflection limiting member 14 may alternatively have a shape to cover part of the side portion 12c of the acoustic matching member 12. For example, as shown in FIG. 5, the reflection limiting member 14 may be provided to a vicinity of the attachment surface 12b.

In the above structure, the reflection of the ultrasonic wave at the side portion 12c near the ultrasonic detecting element 11 can be limited, and therefore the reflected ultrasonic wave reflected by the side portion 12c is restricted from reaching the ultrasonic detecting element 11. As a result, the detection sensitivity to the ultrasonic wave can be improved.

Also, because the vicinity of the attachment surface 12b of the acoustic matching member 12 corresponds to the vicinity of a node portion of a standing wave, the decay of the oscillation in the acoustic matching member 12 due to the cramp (restrain) by the reflection limiting member 14 can be made smaller. As a result, the detection sensitivity to the ultrasonic wave can be improved.

Figure 6A:
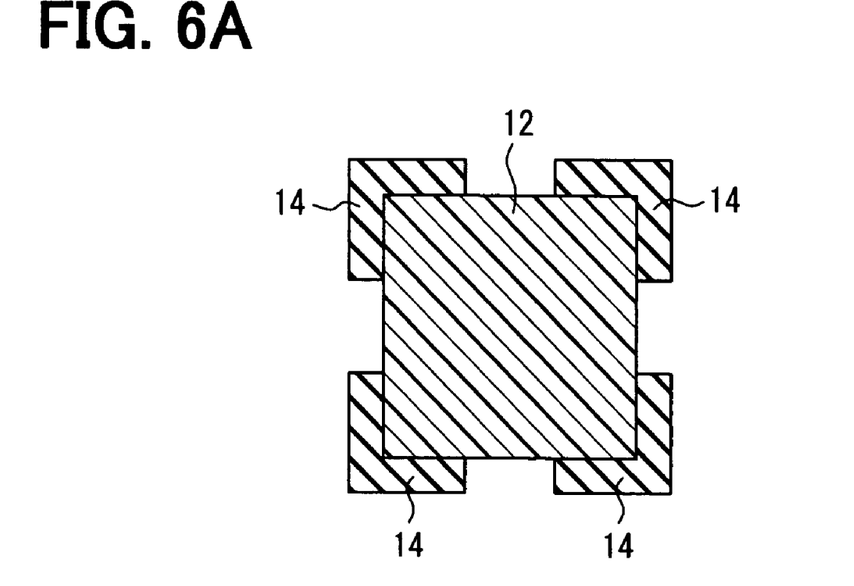
FIGS. 6A and 6B are longitudinal cross-sectional views each showing a reflection limiting member according to another modification.
Figure 6B:
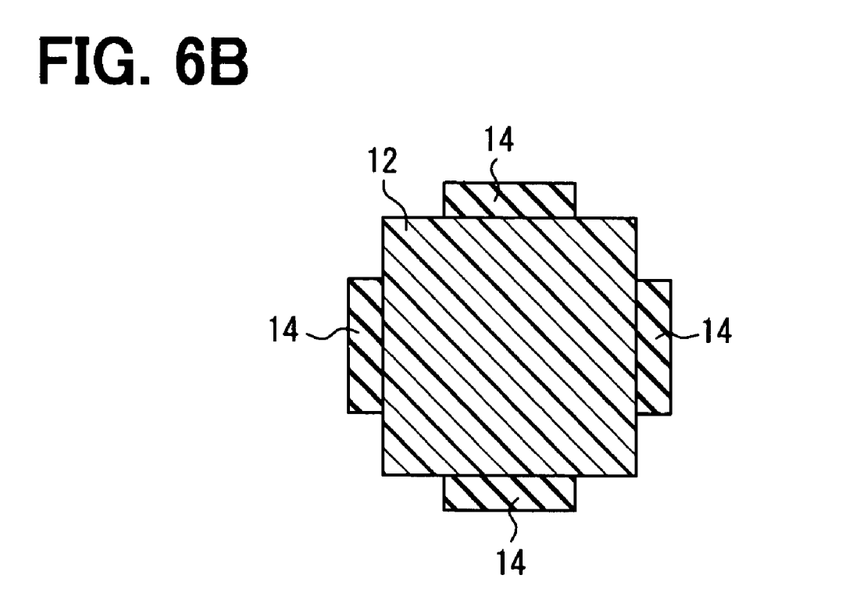

It is noted that the reflection limiting member 14 may have any shape as long as the reflection limiting member 14 is adapted to limit the reflection of the ultrasonic wave at the side portion 12c . For example, as shown in FIG. 6A, the reflection limiting members 14 may be provided at four corners of the acoustic matching member 12, and as shown in FIG. 6B, each of the reflection limiting members 14 may be provided at a central portion of each side of the side portion 12c of the acoustic matching member 12.

(3) An example of the ultrasonic detecting element 11 may include an element in which an oscillation portion formed of a piezoelectric film is formed on a thin film formed as a thin portion of the substrate by using MEMS (Micro Electric Mechanical System) technique. An example of such an element may include a piezoelectric MEMS element or a capacitive MEMS element. Further, an example of the piezoelectric MEMS element may include a membrane type or a cantilever type element.

In addition, an example of the ultrasonic detecting element 11 may include an ultrasonic detecting element which can not only receive but also send signals.

Figure 7:
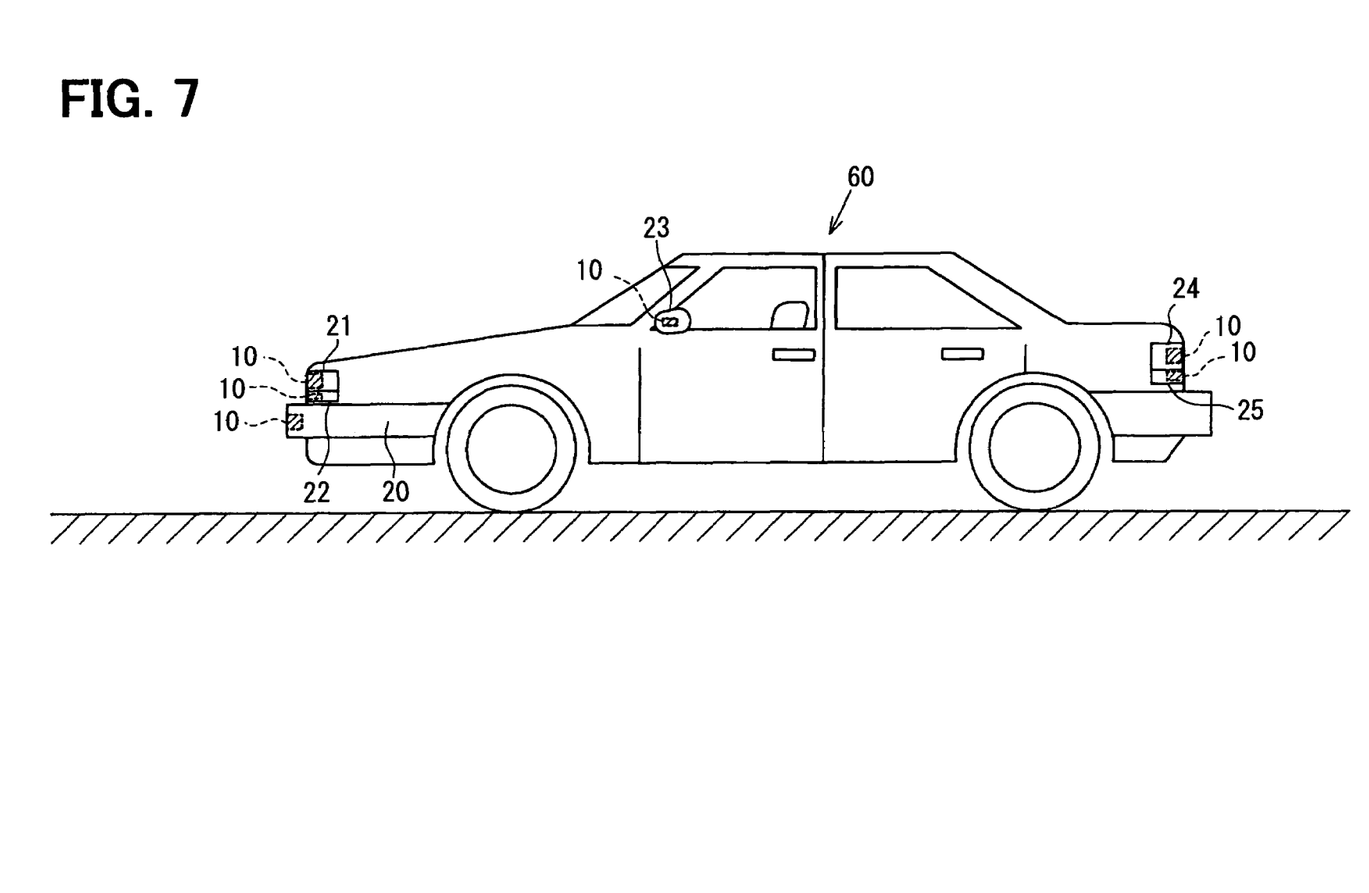
FIG. 7 is a view illustrating positions for mounting the ultrasonic sensor on a vehicle.

The ultrasonic sensor 10 may be attached to a member other than the bumper 20 in a vehicle for use. For example, as shown in FIG. 7, the ultrasonic sensor 10 may be attached to a head lamp cover 21. When this structure is used, since the ultrasonic wave reflected on an obstacle or the like is not blocked by a part of a vehicle, the obstacle can be securely detected by the ultrasonic sensor 10. Accordingly, this structure is effective in a case where the ultrasonic sensor 10 is applied to an obstacle sensor or the like.

Further, the ultrasonic sensor 10 may be attached to other members in accordance with an application thereof. For example, in a case of using the ultrasonic sensor 10 as an obstacle sensor in the side of a vehicle, it may be attached to a cover 22 of a turn signal, a door mirror 23 or the like. In a case of using the ultrasonic sensor 10 as an obstacle sensor in the rear side of a vehicle, it may be attached to a cover 24 of a rear lamp, a cover 25 of a back lamp (i.e., backup light) or the like. In the above case, the ultrasonic sensor 10 may be directly attached to the other member. Alternatively, the ultrasonic sensor 10 may be indirectly attached to the other member via a case. In other words, the attachment portion 20a serves as a part of a case that is one of the head lamp cover 21, the rear lamp cover 24, the turn signal cover 22, the back lamp cover 25, the door mirror 23, and the bumper 20 of the vehicle 60 such that the ultrasonic sensor 10 is directly attached to the other member. Also, the attachment portion 20a serves as another case that receives the ultrasonic sensor 10 for the attachment to one of the head lamp cover 21, the rear lamp cover 24, the turn signal cover 22, the back lamp cover 25, the door mirror 23, and the bumper 20 of the vehicle 60. Thus, in this case, the attachment portion 20a is provided between the ultrasonic sensor 10 and the attachment object such that the ultrasonic sensor 10 is indirectly attached to the other member.

Additional advantages and modifications will readily occur to those skilled in the art. The invention in its broader terms is therefore not limited to the specific details, representative apparatus, and illustrative examples shown and described.

What is claimed is:

1. An ultrasonic sensor attached to a certain object for sensing an ultrasonic wave that is reflected by a detected body, the sensor comprising:
    an acoustic matching member that has a receiving surface that is adapted on a side of the certain object to face toward the detected body, the receiving surface receiving the ultrasonic wave reflected by the detected body, the acoustic matching member transmitting the ultrasonic wave received by the receiving surface and being adapted such that a standing wave is generated inside of the acoustic matching member due to the ultrasonic wave received by the receiving surface;
    an ultrasonic detecting element that is attached to an opposing surface of the acoustic matching member opposite the receiving surface, the ultrasonic detecting element detecting the ultrasonic wave that is transmitted by the acoustic matching member, the acoustic matching member being made of a material having an acoustic impedance larger that that of air and smaller than that of the ultrasonic detecting element; and
    a reflection limiting member that is disposed to a side portion of the acoustic matching member between the receiving surface and the opposing surface, the reflection limiting member limiting the ultrasonic wave, which is transmitted inside the acoustic matching member, from being reflected by the side portion.

2. The ultrasonic sensor according to claim 1, wherein the reflection limiting member is made of a material having the acoustic impedance lower than that of the acoustic matching member.

3. The ultrasonic sensor according to claim 1, wherein the reflection limiting member is made of a material having a degree of elasticity smaller than that of the acoustic matching member.

4. The ultrasonic sensor according to claim 1, wherein the reflection limiting member is made of a silicone rubber.

5. The ultrasonic sensor according to claim 1, wherein the reflection limiting member is provided in a vicinity of the opposing surface.

6. The ultrasonic sensor according to claim 1, wherein the reflection limiting member has at least one of a projection portion and a recess portion on an outer surface thereof such that the ultrasonic wave, that is transmitted from the side portion to an inside of the reflection limiting member is cancelled inside the reflection limiting member.

7. The ultrasonic sensor according to claim 1, the sensor further comprising an oscillation damping member that is disposed between an attachment portion and the acoustic matching member, the attachment portion being adapted for attaching the ultrasonic sensor to the certain object, the oscillation damping member damping transmission of oscillation from the certain object to the acoustic matching member.

8. The ultrasonic sensor according to claim 7, wherein the reflection limiting member is provided integrally with the oscillation damping member by using a common material, of which the oscillation damping member is made.

9. The ultrasonic sensor according to claim 1, wherein:
    the acoustic matching member is one of a plurality of acoustic matching members;
    the ultrasonic detecting element is one of a plurality of ultrasonic detecting elements for making a pair with a corresponding one of the plurality of acoustic matching members;
    a plurality of pairs of the acoustic matching member and the ultrasonic detecting element is arranged in an array; and
    the reflection limiting member is disposed between each of the acoustic matching members.

10. The ultrasonic sensor according to claim 1, wherein the certain object is a vehicle.

11. The ultrasonic sensor according to claim 10, wherein the attachment portion is a case.

12. The ultrasonic sensor according to claim 11, wherein the case is one of a head lamp cover, a rear lamp cover, a turn signal cover, a back lamp cover, a door mirror, and a bumper of the vehicle.

13. The ultrasonic sensor according to claim 11, wherein the case is attached to one of a head lamp cover, a rear lamp cover, a turn signal cover, a back lamp cover, a door mirror, and a bumper of the vehicle.

14. The ultrasonic sensor according to claim 11, wherein:
    the reflection limiting member is provided to part of the acoustic matching members, the part of the acoustic matching members projecting from case.

15. The ultrasonic sensor according to claim 14, wherein the reflection limiting member is provided only to the part of the acoustic matching members.

16. The ultrasonic sensor according to claim 1, wherein:
    the reflection limiting member has an end surface on a side of the reflection limiting member toward the ultrasonic detecting element; and
    the end surface of the reflection limiting member is flush with the opposing surface of the acoustic matching members.

* * * * *